United States Patent
Brisson et al.

(10) Patent No.: US 7,628,070 B2
(45) Date of Patent: *Dec. 8, 2009

(54) INERTIAL SENSOR WITH DISTURBING CURRENT REDUCED BY REDUCING THE WIDTH AND THE SPACING OF TRACKS IN CRITICAL ZONES

(75) Inventors: Raphaël Brisson, Asnieres sur Seine (FR); Paul Featonby, Newcastle-Upon-Tyne (GB)

(73) Assignee: Sagem Defense Securite, Paris (FR)

( * ) Notice: Subject to any disclaimer, the term of this patent is extended or adjusted under 35 U.S.C. 154(b) by 112 days.

This patent is subject to a terminal disclaimer.

(21) Appl. No.: 11/477,923

(22) Filed: Jun. 30, 2006

(65) Prior Publication Data
US 2007/0022812 A1 Feb. 1, 2007

(30) Foreign Application Priority Data
Jul. 4, 2005 (FR) ................... 05 07070

(51) Int. Cl.
G01P 15/10 (2006.01)
G01P 15/09 (2006.01)
(52) U.S. Cl. ................. 73/514.29; 73/514.34
(58) Field of Classification Search .......... 73/671, 73/672, 514.29, 514.34
See application file for complete search history.

(56) References Cited

U.S. PATENT DOCUMENTS

| 6,386,035 B2 | 5/2002 | Janiaud et al. ........... 73/514.29 |
| 6,948,368 B2* | 9/2005 | Onfroy .................... 73/514.21 |
| 2007/0013364 A1* | 1/2007 | Brisson et al. ........... 324/158.1 |

FOREIGN PATENT DOCUMENTS

| EP | 1 353 185 A2 | 10/2003 |
| EP | 1 450 164 A | 4/2004 |
| FR | 2 454 614 A1 | 11/1980 |
| FR | 2 842 914 A1 | 1/2004 |

\* cited by examiner

*Primary Examiner*—Hezron Williams
*Assistant Examiner*—Tamiko D Bellamy
(74) *Attorney, Agent, or Firm*—Muncy, Geissler, Olds & Lowe, PLLC

(57) ABSTRACT

The inertial sensor comprises a piezoelectric plate having a vibrator member defined therein that carries excitation electrodes connected to an excitation circuit comprising conductor tracks carried by the piezoelectric plate, the excitation circuit including a disturbing circuit portion in which two conductor tracks extend on either side of a midplane and present a width less than 50 μm, and preferably equal to 10 μm, and are spaced apart by a distance of less than 100 μm, and preferably equal to 40 μm.

6 Claims, 1 Drawing Sheet

INERTIAL SENSOR WITH DISTURBING CURRENT REDUCED BY REDUCING THE WIDTH AND THE SPACING OF TRACKS IN CRITICAL ZONES

The present invention relates to a piezoelectric inertial sensor.

BACKGROUND OF THE INVENTION

Inertial sensors are known, in particular from document FR-A-2 842 914, that are made from a piezoelectric quartz plate having formed therein by etching: a support member, a decoupling frame connected to the support member, and a vibrator member connected to a mass associated with the decoupling frame, the vibrator member carrying excitation electrodes connected to an excitation circuit including conductor tracks carried by the piezoelectric plate.

The excitation circuit is fed with alternating current (AC) leading, by the piezoelectric effect, to the vibrator member being set into vibration at a resonant frequency of vibration of said vibrator element. When the sensor is subjected to acceleration, the mass exerts a force on the vibrator element that modifies the frequency of vibration in such a manner that variation in the frequency of vibration of the vibrator element makes it possible to determine the acceleration to which the sensor is subjected.

Modification to the frequency of vibration is measured by measuring current in the excitation circuit.

Nevertheless, it has been found that when the sensor is subjected to a defined acceleration, the current as measured does not correspond exactly to the variation in the frequency of vibration of the vibrator element, with the current that is picked up including disturbing current that is added to the useful current in a manner that disturbs the useful information and that goes from as far as to saturate the electronics implemented in the sensor and thus to cause the accelerometer to malfunction.

OBJECT OF THE INVENTION

An object of the invention is to minimize the disturbing current that is superposed on the useful current.

SUMMARY OF THE INVENTION

According to the observation that forms part of the invention, it has been determined that the disturbing current is generated for the most part by disturbing portions of the excitation circuit in which two conductor tracks extend side by side on either side of a midplane of a plate portion that is subjected to deformation while the sensor is being subjected to acceleration. It has been found that charges of opposite signs then appear on either side of the midplane and are picked up by the closer conductor track such that said charges generate a disturbing current that increases with the conductor tracks coming closer to the edges of the corresponding plate portion. Typically, in existing sensors, the conductor tracks have a width of 50 micrometers ($\mu$m) and they are spaced apart by a distance of 100 $\mu$m.

According to the invention, provision is made in the disturbing circuit portions for conductor tracks to have a width of less than 50 $\mu$m and preferably a width lying in the range 5 $\mu$m to 20 $\mu$m, the conductor tracks being spaced apart by a distance of less than 100 $\mu$m, and preferably by a distance lying in the range 10 $\mu$m to 50 $\mu$m. It has been found that conductor track width of less than 5 $\mu$m runs the risk of leading to disturbances in track conduction, and a distance of less than 10 $\mu$m runs the risk of leading to parasitic capacitive effects that reduce the beneficial effects obtained by reducing the disturbing current.

BRIEF DESCRIPTION OF THE DRAWING

Other characteristics and advantages of the invention appear on reading the following description of a non-limiting particular embodiment of the invention, given with reference to the accompanying figures, in which.

DETAILED DESCRIPTION OF THE INVENTION

Figure 1:
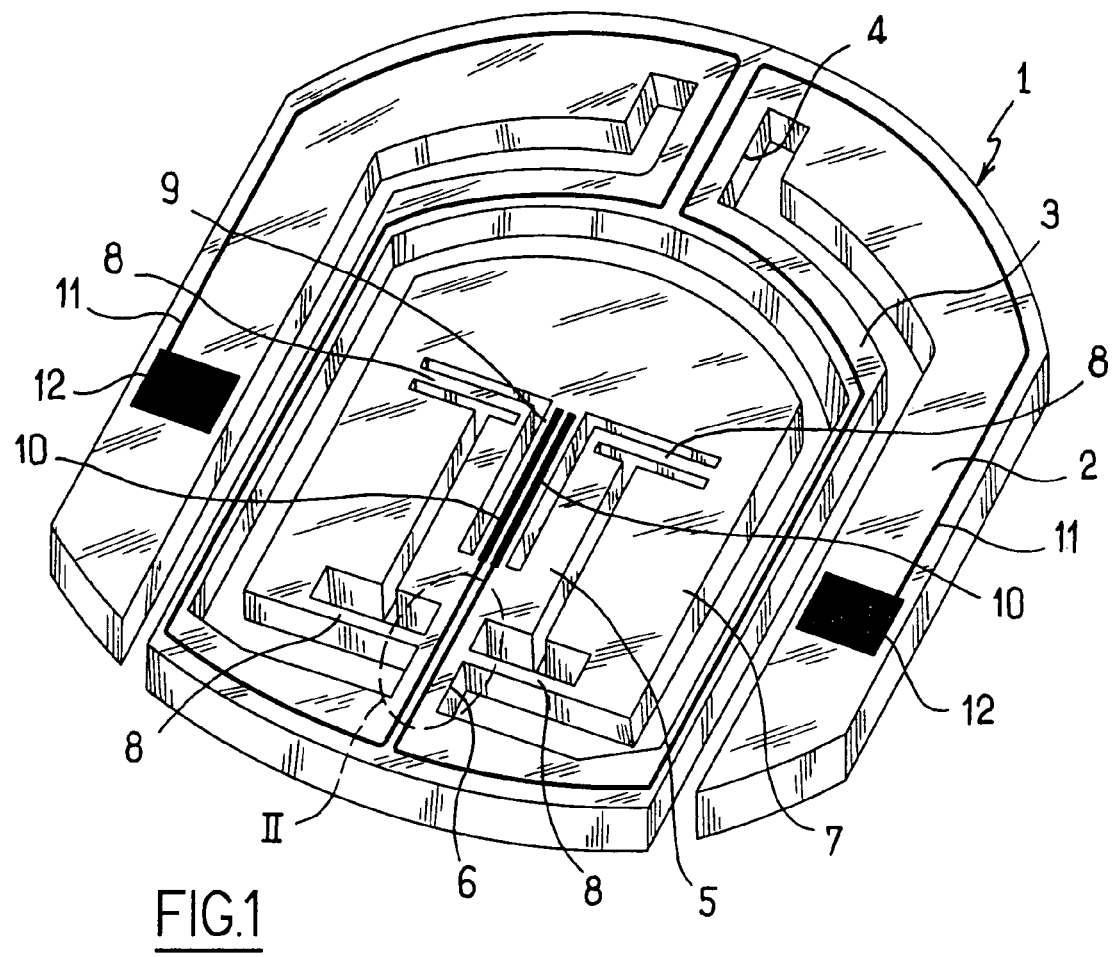
FIG. 1 is a perspective view larger than life size showing a preferred embodiment of the inertial sensor of the invention.
Figure 2:
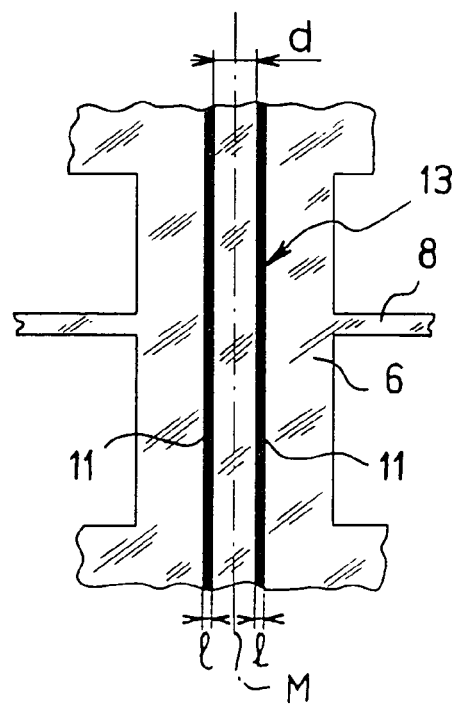
FIG. 2 is a fragmentary plan view on an even larger scale showing zone II of FIG. 1.

With reference to the figures, the sensor of the invention comprises in a manner known from the above-specified document, a piezoelectric quartz plate 1 having defined therein: a support member 2 for securing in a housing, a decoupling frame 3 having one side connected to the support member 2 via a bridge 4, and an opposite side connected to a first mass 5 via a bridge 6, a second mass 7 connected to the first mass 5 and to the bridge 6 by link elements 8, and a vibrator element 9 having ends secured to the masses 5 and 7, all of these elements being etching the piezoelectric plate 1.

Also in known manner, the vibrator member 9 has two excitation electrodes 10 connected to an excitation circuit comprising two conductor tracks 11 connected to power supply and measurement terminals 12. At the bridges 4 and 6, which are subjected to deformation when the sensor is subjected to acceleration, the excitation circuit includes circuit portions 13 where the conductor tracks 11 extend beside each other on either side of a midplane M of the bridge.

Thus, as stated above, it has been found in the invention that the structure of these circuit portions generates a disturbing current.

According to the invention, in the disturbing circuit portions 13, the conductor tracks 11 are of width 1 less than 50 $\mu$m, and preferably of width 10 $\mu$m or at any rate of width lying in the range 5 $\mu$m to 20 $\mu$m, and they are spaced apart by a distance of less than 100 $\mu$m, preferably by a distance equal to 40 $\mu$m and in any rate by a distance lying in the range 10 $\mu$m to 50 $\mu$m.

Naturally, the invention is not restricted to the embodiments described and variants can be applied thereto without going beyond the ambit of the invention as defined by the claims.

In particular, the invention applies to any sensor in which the excitation circuit includes a disturbing circuit portion in which two conductor tracks extend beside each other on either side of a midplane of a plate portion that is subjected to deformation when the sensor is subjected to acceleration, regardless of the structure of the sensor elsewhere. By way of non-limiting example, the mass 5 may be totally integrated in the decoupling frame 3 such that the sensor then has only one disturbing circuit portion (on the bridge 4). The sensor could also have a first mass 5 directly connected to the support member. As in the preceding case, the sensor then has a single disturbing circuit portion. Conversely, the sensor could have a plurality of members associated in cascade, thereby multiplying the number of disturbing circuit portions.

What is claimed is:

1. An inertial sensor comprising a piezoelectric plate having defined therein a vibrator member carrying excitation electrodes connected to an excitation circuit comprising at least two conductor tracks carried by the piezoelectric plate, the excitation circuit including a disturbing circuit portion in which the two conductor tracks extend side by side and on either side of a midplane of a portion of the plate that is subjected to deformation when the sensor is subjected to acceleration, wherein, in the disturbing circuit portion, the conductor tracks are of a width less than 50 μm.

2. A sensor according to claim 1, wherein, in the disturbing circuit portion, the conductor tracks are of a width lying in the range 5 μm to 20 μm.

3. A sensor according to claim 1, wherein, in the disturbing circuit portion, the conductor tracks are of a width of 10 μm.

4. A sensor according to claim 1, wherein, in the disturbing circuit portion, the conductor tracks are spaced apart by a distance of less than 100 μm.

5. A sensor according to claim 4, wherein, in the disturbing circuit portion, the tracks are spaced apart by a distance lying in the range 10 μm to 50 μm.

6. A sensor according to claim 5, wherein, in the disturbing circuit portion, the tracks are spaced apart by a distance equal to 40 μm.

* * * * *